US005673464A

United States Patent [19]
Whittaker

[11] Patent Number: 5,673,464
[45] Date of Patent: Oct. 7, 1997

[54] CARGO SECUREMENT SYSTEM AND TIE DOWN STRAP

[76] Inventor: Mark Whittaker, 20101-B Henderson Rd., Cornelius, N.C. 29031

[21] Appl. No.: 710,168

[22] Filed: Sep. 12, 1996

Related U.S. Application Data

[63] Continuation-in-part of Ser. No. 334,752, Nov. 4, 1994, abandoned.

[51] Int. Cl.$^6$ .................. B65B 11/00; B65D 63/00; A44B 21/00; A44B 13/00
[52] U.S. Cl. .................. 24/301; 24/68 CD; 410/97
[58] Field of Search .................. 24/16 R, 16 PB, 24/17 R, 193, 115 F, 301, 300, 602, 68 CD, 299; 248/499; 410/96–103

[56] References Cited

U.S. PATENT DOCUMENTS

| | | | |
|---|---|---|---|
| 1,924,992 | 8/1933 | Jasper | 280/33.14 |
| 2,372,967 | 5/1945 | Martin | 248/361 |
| 2,455,237 | 11/1948 | Davis | 410/97 |
| 2,709,027 | 5/1955 | Kozub | 24/16 R |
| 3,522,635 | 8/1970 | Nilsson | 24/73 |
| 3,913,178 | 10/1975 | Ballin | 24/16 PB |
| 3,961,585 | 6/1976 | Brewer | 410/97 |
| 4,426,908 | 1/1984 | Ullmann | 87/6 |
| 4,466,159 | 8/1984 | Burrage | 24/16 PB |
| 4,569,108 | 2/1986 | Schwab | 24/301 X |
| 4,694,541 | 9/1987 | Skyba | 24/301 |
| 4,757,578 | 7/1988 | Lamb | 24/301 X |
| 4,769,875 | 9/1988 | Hartman | 24/300 |
| 4,779,411 | 10/1988 | Kendall | 59/78 |
| 5,118,127 | 6/1992 | Partington | 280/488 |
| 5,176,248 | 1/1993 | Allen et al. | 198/850 |
| 5,193,955 | 3/1993 | Chou | 24/68 CD X |
| 5,195,217 | 3/1993 | Arntzen | 24/115 F |
| 5,253,393 | 10/1993 | Levin | 24/301 |
| 5,308,101 | 5/1994 | Monty | 280/480.1 |
| 5,311,967 | 5/1994 | Kennedy | 182/133 |
| 5,440,790 | 8/1995 | Chou | 24/68 CD X |
| 5,458,447 | 10/1995 | Clason | 410/97 X |

FOREIGN PATENT DOCUMENTS

| | | | |
|---|---|---|---|
| 1028058 | 5/1953 | France | 24/300 |
| 1146490 | 11/1957 | France . | |
| 2447871 | 1/1979 | France . | |
| 779944 | 7/1957 | United Kingdom . | |

OTHER PUBLICATIONS

Brochure entitled "EZ-STRAP"; Consolidated Developmental Industries, Inc.; date unknown, but prior to 1996.

*Primary Examiner*—Peter M. Cuomo
*Assistant Examiner*—Robert J. Sandy
*Attorney, Agent, or Firm*—Shefte, Pinckney & Sawyer

[57] ABSTRACT

A tie down strap includes two end portions and a main body portion extending therebetween having a plurality of openings integrally formed therein. The openings extend in a sequential manner linearly aligned along the main body portion intermediate the end portions and are dimensioned to receive therethrough a main body portion of another strap when the main body portion defining the opening is elongated. Specifically, the main body portion comprises two side members that extend between the two end portions in spaced parallel relation and a plurality of bridge portions that extend between and secure the two side members in their parallel relation. Moreover, the end portions have securement members such as hooks and each bridge portion is configured to be received within each securement member in substantially continuous contact therewith.

8 Claims, 5 Drawing Sheets

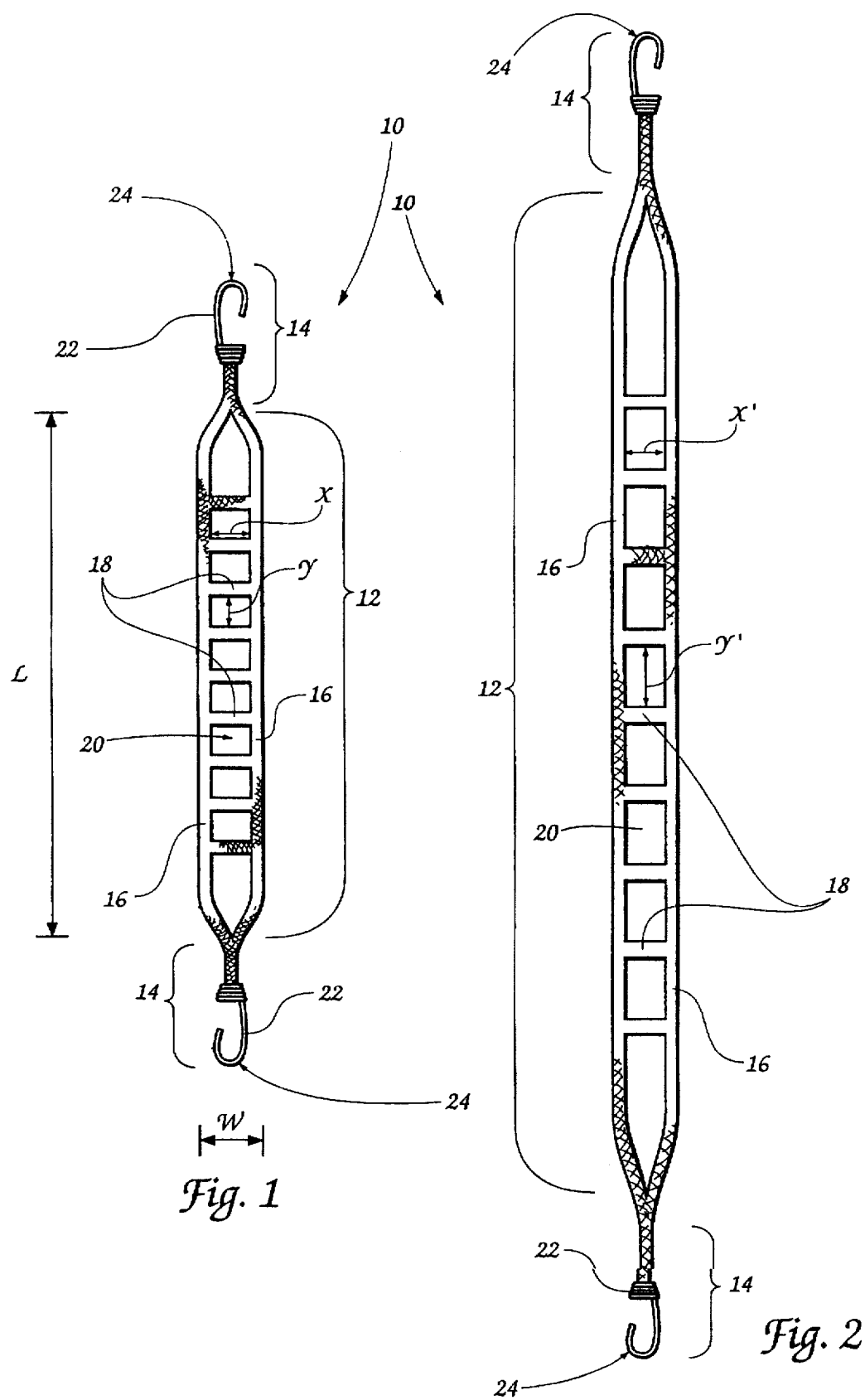

CARGO SECUREMENT SYSTEM AND TIE DOWN STRAP

The present application is a continuation-in-part of U.S. patent application Ser. No. 08/334,752, by Mark Whittaker filed Nov. 4, 1994, now abandoned for TIE DOWN STRAP WITH ATTACHMENT OPENINGS.

FIELD OF THE INVENTION

The present invention relates broadly to a cargo securement system for restraining or "tieing down" cargo and, more specifically, to an elastic strap or "bungee cord" for extending between attachment locations to releasably restrain movement of cargo or other items.

BACKGROUND OF THE INVENTION

When transporting cargo or other items, in or on a truck, automobile or other vehicle, it often becomes necessary to restrain the cargo from movement due to, among other things, directional changes, vibrations and/or wind. Further, people often have to tie down the trunk lid of an automobile over an item which is too large to fit within a closed trunk. In addition, the items may have an unusual configuration, or a stack of regularly shaped items may present an unusual and unstable configuration which must be restrained in some manner. Currently, elastic cords known as "bungee cords" or "tie-downs" are used to extend between attachment locations in substantial abutment with the items to be restrained and wrap around, extend over, or generally engage the items to restrict movement of the items. These cords typically include a hook disposed at each end for engagement with each other, other cord hooks, anchoring assemblies on a cargo support, or even another portion of the instant cord.

The cords themselves are formed as generally elongate, tubular elastic members and some include a fabric covering. The hooks are typically metal. Another type of tie-down is formed of rubber and includes two small openings in either end thereof Metal "S"-shaped hooks are insertable in the small openings and their use is compatible with the fabric covered cords.

Problems exist when attachment locations are scarce. For example, when tieing down a trunk lid, there are typically limited anchoring positions available and the lid is sometimes difficult to completely secure. Further, when tieing down open cargo, it is often necessary to configure several straps around an odd shaped cargo bundle and ready attachment locations are sometimes difficult to find.

SUMMARY OF THE INVENTION

It is accordingly an object of the present invention to provide a cargo securement system that is easier to deploy about odd shaped cargo.

It is a further object of the present invention to provide a cargo securement system comprising a plurality of tie down straps, each strap providing additional attachment locations for other like straps.

It is further an object of the present invention to provide such a tie down strap which will provide attachment locations for its own hooks.

Yet another object of the present invention is to provide a tie down strap through which a second tie down strap is extendable for providing an intermediate attachment location of the second tie down strap.

Another object of the present invention is to provide such a tie down strap which is simple to manufacture and to use.

To that end, the cargo securement system of the present invention includes a tie down strap provided for securing cargo against movement by extending the strap between attachment locations in at least intermittent abutment with the cargo. The strap comprises two end portions and a main body portion extending therebetween. At least one of the end portions, and preferably each end portion, includes a securement member, preferably a hook, for securing the end to an attachment location.

The main body portion of the strap is disposed between the two end portions and includes an elongateable linearly extending elastic main body portion. Moreover, the main body portion has a depth dimension substantially less than its width dimension and a length dimension substantially greater than its width dimension. As contemplated by the present invention, the main body portion of the strap of the present invention does not include either end portion of the strap between which it extends.

The main body portion of the present invention preferably includes two surfaces defined by the length and width thereof, with a plurality of openings integrally formed within the body portion and extending therethrough to the two surfaces. Moreover, the openings are linearly aligned in a sequential manner along the main body portion intermediate the end portions for interaction with other tie down straps in securing cargo, with each opening being dimensioned for the passage therethrough of a main body portion of a tie down strap when the elastic main body portion defining the openings is stretched or otherwise elongated.

Specifically, the main body portion of the strap of the present invention preferably includes two side members extending in spaced parallel relation to one another between the two end portions. The main body portion also includes a plurality of bridge portions that are sequentially arranged along the main body portion and extend between the side members and secure the side members in the parallel relation. Moreover, the two side members and bridge portions thereby define the plurality of openings.

In accordance with one feature of the present invention, each bridge portion is dimensioned to be received within a securement member associated with an end portion, i.e., the securement member is shaped pass through one opening, curve around a bridge member, and pass back through another opening. Thus, each opening formed in the main body portion provides an attachment location for a securement member for attachment not only about a side of a strap, but about a bridge portion as well.

More importantly, however, and in accordance with another feature of the present invention, each opening is dimensioned for the passage therethrough of a main body portion of a tie down strap when the elastic main body portion defining the opening is stretched or elongated. Furthermore, because each opening is stretchable to accommodate the passage therethrough by another strap, upon the passage of a strap through an opening, the opening contracts about the strap and preferably provides resistance against sliding movement of the strap extending therethrough. Moreover, the opening thus becomes an intermediate attachment location for the strap passing therethrough that redirects the linear tension of the strap.

In sum, the cargo securement system of the present invention utilizes a plurality of straps to restrain cargo against movement, each opening along the main body portion of the strap configured for the releasable receipt therethrough of a securement member and for passage therethrough of a main body portion of a like strap within the system so that the straps cooperate to secure items against movement. In particular, due to the addition of openings along the main body portion of each strap, the dimension of the openings and the dimensions of the bridge portions formed therebetween, other like straps may be attached at various angles or actually directed through the openings to permit the securement of cargo or other items in almost any disposition.

BRIEF DESCRIPTION OF THE DRAWINGS

FIG. 1 is an elevational view of a tie down strap according to the preferred embodiment of the present invention;

FIG. 2 is an elevational view of the tie down strap illustrated in FIG. 1 in a stretched condition;

DETAILED DESCRIPTION OF THE PREFERRED EMBODIMENT

Figure 7:
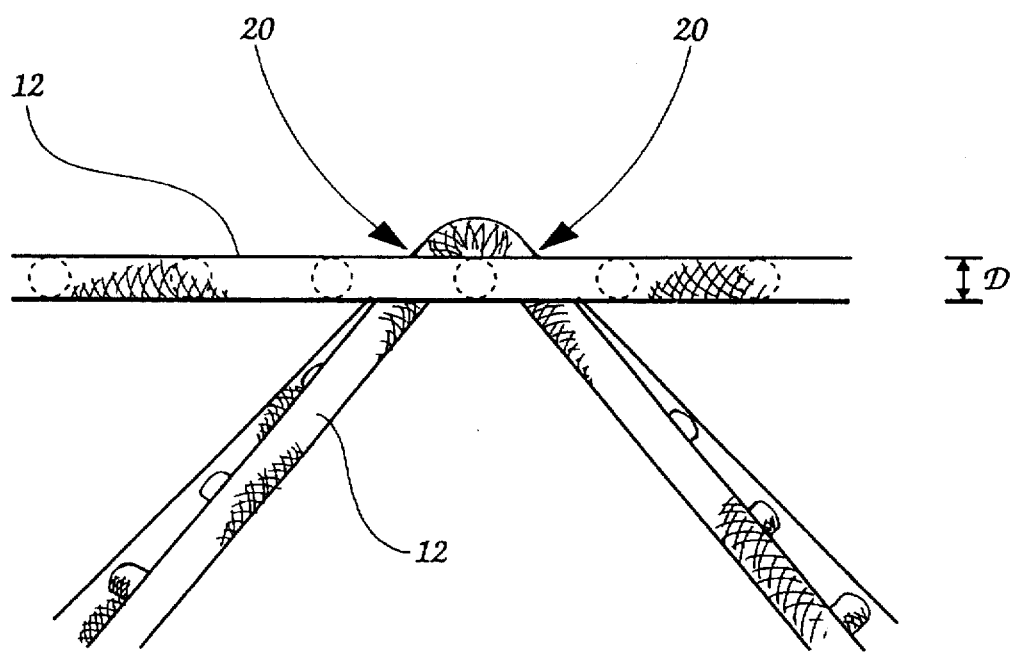
FIG. 7 is a side view of a main body portion of a strap passing through two adjacent openings around a bridge portion in another like strap.

Turning now to the drawings and, more particularly, to FIGS. 1 and 2, a tie down strap 10 according to the cargo securement system of the present invention includes an elongateable linearly extending main body portion 12 that has a length L that is substantially greater than its width W. Furthermore, as shown in FIG. 7, the main body portion 12 also has a depth D that is substantially less than the width W. The main body portion 12 is disposed between two end portions 14 and comprises two side members 16 that extend in spaced parallel relation between the two end portions 14. As contemplated by the present invention, the main body portion 12 is attached to but reference thereto is not intended to include the end portions 14.

Bridge portions 18 are sequentially arranged along the length of the main body portion 12 and extend in the widthwise direction to secure the two side members 16 together, thereby substantially maintaining the spaced parallel relation of the two side members 16. Moreover, side members 16 and bridge portions 18 thereby define a plurality of openings 20 integrally formed in a linearly sequential manner along the length of the main body portion 12. Each opening preferably is rectangularly defined by side members 16 and bridge portions 18 whose dimension Y in the lengthwise direction of the strap is less than the dimension X in the widthwise direction of the strap 10, as shown in FIG. 1. Each bridge portion 18 is preferably cylindrical in shape, but may have any geometrical configuration such as a circular configuration so long as the configuration corresponds with a securement member of an end portion 14, as explained more fully presently.

The end portions 14 each include a securement member that is preferably a hook 22 having an engaging portion 24 for engagement with virtually any type of attachment location. Preferably, the engaging portion 24 is "U"-shaped. If desired, each hook 22 can be releasably secured in an end portion 14 by any conventional means such as by extending the hook 22 through a hole (not shown), but preferably the hook 22 is formed as part of the end portion 14 and is not removable therefrom.

Figure 5:
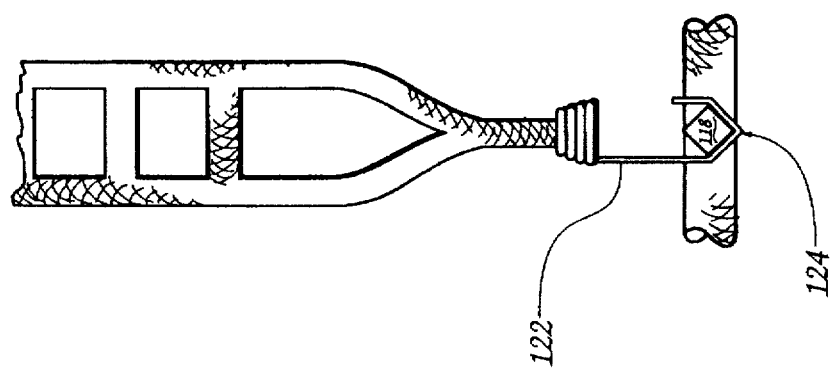
FIG. 5 is a side view similar to FIG. 4 but showing an alternatively shaped securement member and bridge portion engaged together.
Figure 4:
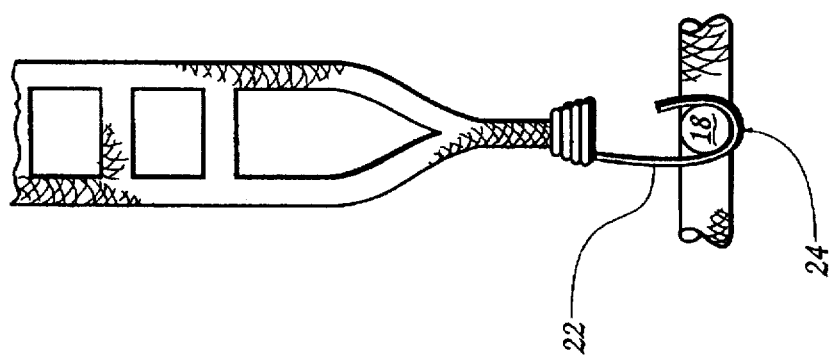
FIG. 4 is a side view of FIG. 3 taken along line 4—4 showing a securement member and bridge portion engaged together.
Figure 3:
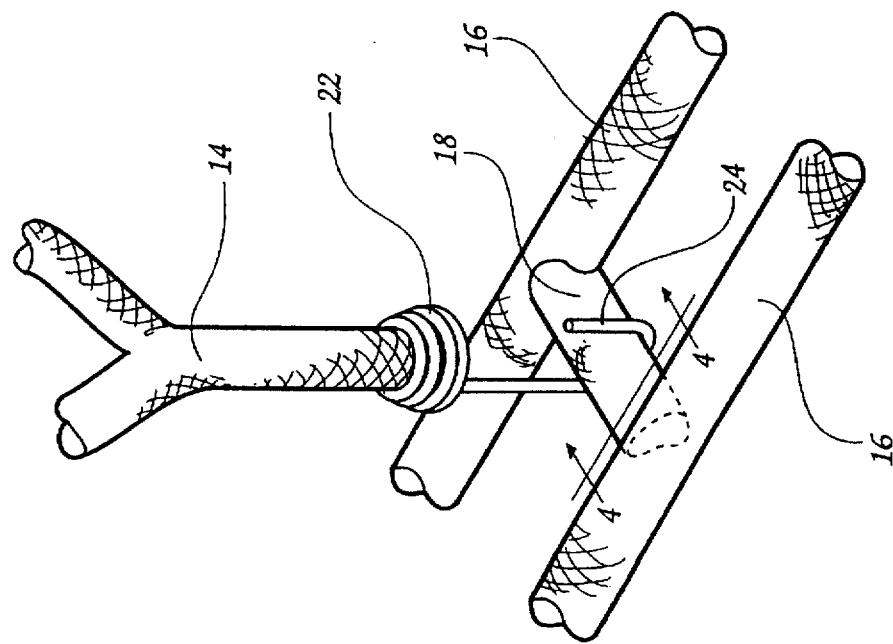
FIG. 3 is a perspective view of a feature of the present invention wherein a securement member is releasably secured to a bridge portion of a main body portion of a strap of the present invention.

Each bridge portion 18 has a surface configuration receivable within the engaging portion 24 of hook 22 of an end portion 14 in substantially continuous contact therewith. In the preferred embodiment, the cylindrical bridge portion 18 is configured to be received within the "U"-shaped curved portion 24 for secure engagement in substantially continuous contact therewith, as shown in FIGS. 3 and 4. Alternatively, as shown in FIG. 5, an engaging portion 124 of an alterative hook 122 can be angularly shaped for receipt therein of a rectangularly-configured bridge portion 118. In any event, the bridge portion 18 and the engaging portion 24 of the hook 22 are configured with corresponding engaging surfaces for secure and substantially continuous engagement therebetween. Thus, according to one feature of the present invention, a bridge portion 18 functions as an attachment location for its respective strap 10 and like straps.

As with conventional tie down cords, the tendency of an elastic material to return to its original configuration provides a natural tightening around whatever cargo is being restrained thereby. Accordingly, the strap 10 of the present invention is elastic, with main body portion 12, including side members 16 and bridge portions 18, being formed of rubber or some other resilient material and covered in a knitted fabric. Furthermore, if desired, bridge portions 18 can be formed of a material having a different elasticity than the side members 16.

Each hook 22 associated with each end portion 14, on the other hand, is preferably formed of metal and may be covered by a plastic coating, and the rest of the end portion 14 is formed of rubber or some other resilient material, covered in knitted fabric, and integrally joined to the two side members 16. Thus, the strap 10 of the present invention is capable of elongation in the lengthwise and widthwise direction, and is stretchable between a relaxed condition, as shown in FIG. 1, and a stretched condition, as shown in FIG. 2. Moreover, the strap of the present invention, and notably side members 16, are formed of an elastic material that provides greater strength than that of conventional tie down straps, since the plurality of openings 20 formed in the main body portion 12 inherently weakens the main body portion 12.

Figure 6:
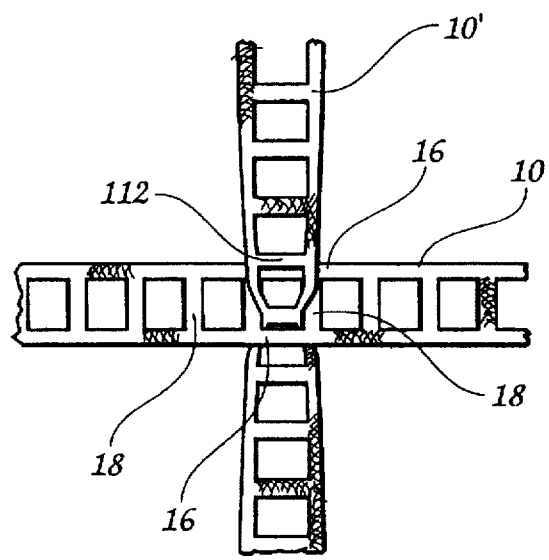
FIG. 6 is a perspective view illustrating a feature of the present invention wherein the main body portion of one strap passes through an opening in another like strap.

When the strap 10 is stretched as shown in FIG. 2, the side members 16 elongate in the lengthwise direction of the strap 10. Furthermore, the bridge members 18 tend to resiliently contract. Thus, the dimension X' of opening 20 in the widthwise direction of the strap 10 becomes less than the dimension X of opening 20 of the strap 10 when unstretched, and the elongated dimension Y of the opening 20 in the lengthwise direction of the strap 10 becomes greater than the dimension Y of the strap 10 when unstretched. Furthermore, the elongated dimension Y' of the opening in the lengthwise direction preferably becomes greater than the width W of an unstretched strap, and the contracted dimension X' of the opening 20 in the widthwise direction of the strap 10 preferably remains greater than the depth of the strap D. Hence, upon elongation of the strap 10, each opening 20 becomes dimensioned for receipt therethrough of a like but unstretched strap according to the present invention. Moreover, upon retraction of the elongated strap 10, the opening 20 of strap 10 through which another strap 10' is extended preferably contracts about the strap 10' extended therethrough for tight engagement as shown in FIG. 6. Thus, the strap of the present invention features openings which are dimensioned upon elongation of the strap for receipt therethrough of another like strap 10', or of the same strap 10 if it is folded back on itself, and specifically, for the receipt therethrough of a main body portion of a strap of the present invention.

This feature of the present invention furthermore allows a main body portion of a strap to be passed through an opening 20 of strap 10, curved about an adjacent bridge portion 18, and extended back through an adjacent opening 20 for wrapping of the strap about the bridge portion 18 as shown in FIG. 7. Thus, each bridge portion of the strap of the present invention not only provides an attachment location for a securement member of the strap of the present invention as discussed above, but also provides an intermediate securement member about which a strap of the present invention can be redirected. Moreover, the elongated strap 10 through which a strap is twice extended will, when retracted, resist unwanted sliding of the strap extended therethrough.

A plurality of straps 10 are employed in the cargo securement system of the present invention. In order to provide attachment locations for these straps when few attachment locations are available in the cargo environment, each bridge member of each strap preferably is configured to be received within a securement member of each end portion of each strap, as discussed above. Moreover, in another feature of the present invention, each one of the openings in the main body portion of each strap is dimensioned so that, upon elongation of its respective strap, a main body portion of another strap may pass therethrough, and if desired, around an adjacent bridge portion and back through an adjacent opening, also as previously discussed. Thus, the bridge portion of each strap preferably not only provides an attachment location, but also an intermediate attachment location for redirection of a like strap between two attachment locations. Hence, each strap provides a plurality of avenues for the lacing of the straps if desired.

Figure 8:
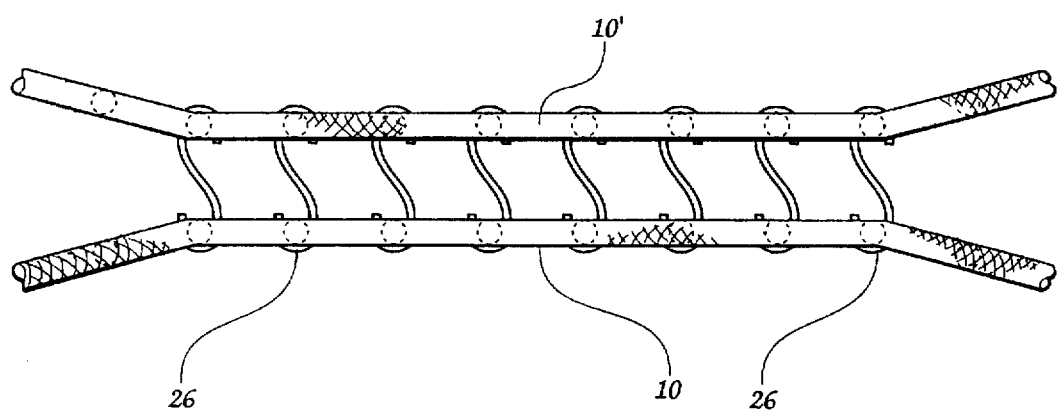
FIG. 8 is a side view of two straps of the present invention hooked together by "S"-hooks in accordance with a feature of the present invention.

As a result of this versatile use of the bridge portions of the straps of the present invention, two straps 10,10' of the present invention may be joined together by conventional "S∞-hooks 26 for parallel disposition along a portion of each strap's main body portion, as shown in FIG. 8. While two "S"-hooks 26 should be sufficient, a plurality of "S"-hooks 26 may be employed along the length of the parallel portions of the main body portions for reinforcement of the parallel disposition.

Figure 9:
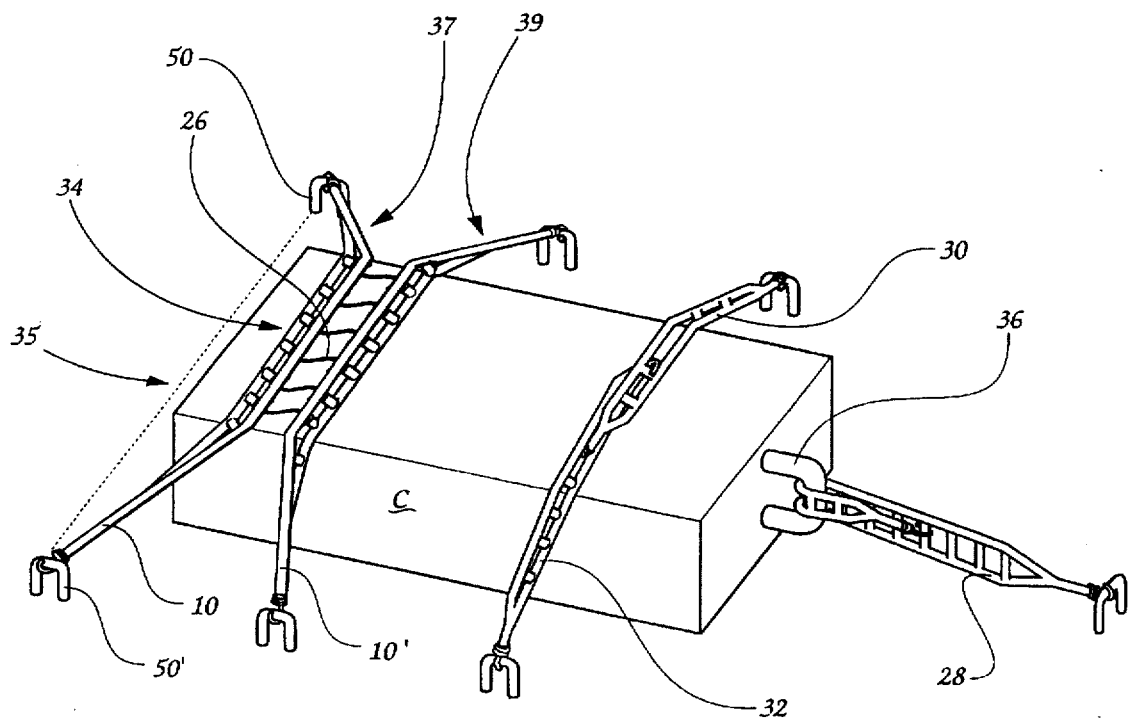
FIG. 9 is a perspective view of the cargo securement system of the present invention.
Figure 10:
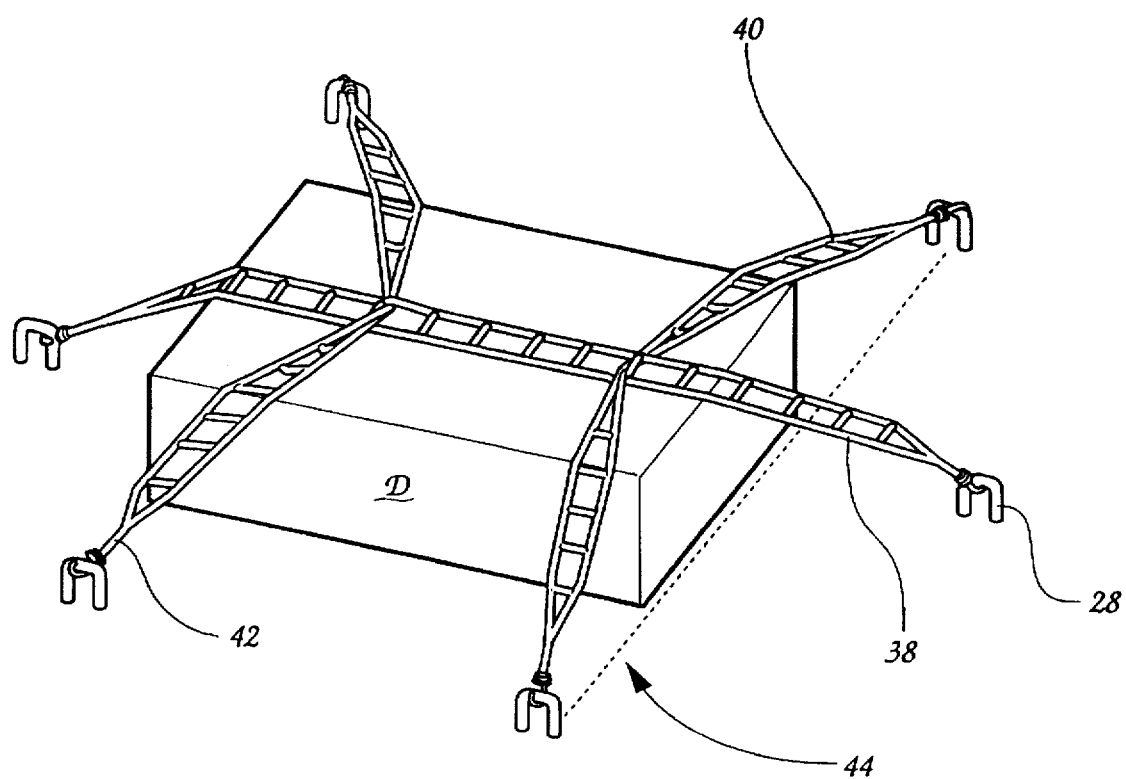
FIG. 10 is a perspective view of another cargo securement system of the present invention.

With reference to FIGS. 9 and 10, the features of the present invention are utilized in restraining cargo and it can be seen how the straps interact to form a complete cargo securement system. In FIG. 9, two straps 10,10' of the present invention are utilized in partial parallel disposition at 34 for restraint of cargo C. Without this feature of the present invention, strap 10 between the two attachment locations 50,50' would not be engageable with cargo C as shown by phantom strap 35. However, by joining two straps 10,10' in parallel disposition, both the attachment locations 50,50' of the cargo environment may nevertheless be utilized. The degree of parallel disposition of the straps 10,10' depends upon the distance between the outer "S"-hooks 26 employed between the two straps 10,10'.

In another feature of the present invention, a strap 32 is secured to a bridge portion of another strap 30, and similarly, strap 30 is secured to a bridge portion of strap 32 in restraint of the cargo C, each strap 30,32 providing an attachment location for the other strap 32,30, respectively. Similarly, in restraining a handle 36 of the cargo C, strap 28 curves through the handle 36 and attaches to one of its own bridge portions.

In FIG. 10, three straps are utilized in restraining cargo D, with strap 38 passing along an axis of the rectangular cargo D, and straps 40 and 42 each extending through openings in strap 38 at locations on the top surface of the cargo D. As illustrated by phantom strap 44, strap 40 would not abut and restrain the cargo D if strap 40 were not passed through an opening in strap 38 due to the inopportune location of the attachment locations in the cargo environment. A similar situation exists for strap 42.

Accordingly, as demonstrated in FIGS. 9 and 10, the straps of the present invention may be used in a cooperating relationship to restrain cargo of virtually any configuration in virtually any environment.

It will be apparent to those skilled in the art that the present invention is capable of further cooperative uses with other like straps and other items which may provide an attachment location for the strap. Accordingly, the uses for the strap of the present invention are myriad and it is plain that the present invention provides utility beyond what is illustrated here.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A tie down strap extendable between attachment locations in at least intermittent abutment with cargo to restrain movement of the cargo, comprising:

two end portions and an elongateable linearly extending elastic main body portion disposed therebetween, means formed in at least a first said end portion thereof for attaching said main body portion to an attachment location, and a plurality of openings integrally formed within and extending in a sequential manner linearly aligned along said linearly extending main body portion intermediate said end portions, each said opening being dimensioned for the passage therethrough of a main body portion of a second identical tie down strap for the redirection of the second identical tie down strap when the elastic main body portion defining said opening is elongated.

2. A tie down strap according to claim 1 wherein said main body portion comprises two side members extending in spaced parallel relation between said two end portions, and further comprising bridge portions that are sequentially arranged along said main body portion and extend between and secure in parallel relation said two side members, said bridge portions and said side members thereby defining said openings.

3. A tie down strap according to claim 2, wherein, when a main body portion of an identical second tie down strap is extended through one of said openings, said bridge portions and said side members defining said opening contract about the identical second tie down strap to restrain movement thereof when said elongated main body portion is relaxed.

4. A tie down strap according to claim 2 wherein said attaching means includes a hook at each said end portion having an engaging portion configured to receive therein one of said bridge portions for substantially continuous contact therebetween, each said engaging portion extendable through a first opening adjacent said bridge portion, around said bridge portion, and through a second opening adjacent said bridge portion when said engaging portion receives said bridge portion therein.

5. A tie down strap according to claim 4, wherein said engaging portions are "U"-shaped and said bridge portions are cylindrically shaped and configured to be received within said "U"-shaped engaging portions for substantially continuous contact therebetween.

6. A cargo securement system for restraining movement of cargo, comprising:

a plurality of elongateable straps, each said strap having two end portions
  a elongateable linearly extending main body portion disposed therebetween, and
  hook means disposed on each said end portion for removably attaching said end portions to attachment locations, said hook means having engaging portions,
  each said main body portion comprising two side members extending in spaced parallel relation between said two end portions and bridge portions that are sequentially arranged along said main body portion and that extend between and secure in parallel relation said two side members, said side members and said bridge portions thereby defining a plurality of openings integrally formed within and extending in a sequential manner linearly along said linear-extending main body portion, each said strap of the cargo securement system cooperating with other said straps to restrain movement of the cargo, said bridge portions of each said strap being configured to be received within said engaging portions of said hook means of each said strap in substantially continuous contact therewith for providing attachment locations for said strap, said openings of each said strap being dimensioned for the passage therethrough of a main body portion of another said strap for the redirection of said strap extended therethrough.

7. A cargo securement system of claim 6, comprising two straps and a plurality of "S"-hooks having engaging portions, wherein said "S"-hooks join part of said main body portions of said two straps in parallel spaced relation, each said "S"-hook extending through two openings in each said main body portion of each said strap and receiving a bridge portion of each strap within its said engaging portions.

8. A cargo securement system, comprising a plurality of elongateable straps, each strap comprising:

two end portions and an elongateable linearly extending elastic main body portion disposed therebetween having a plurality of openings, said main body portion including two side members extending in spaced parallel relation between said two end portions and bridge portions which are sequentially arranged along said main body portion and which extend between and secure in parallel relation said two side members, said bridge portions and said side members thereby defining said openings, wherein said openings are dimensioned for the passage therethrough of one of said plurality of straps for the redirection of said one strap extended therethrough.

* * * * *